(12) United States Patent
Bhatt et al.

(10) Patent No.: US 11,416,700 B1
(45) Date of Patent: Aug. 16, 2022

(54) COMPUTER-BASED SYSTEMS CONFIGURED FOR MACHINE LEARNING VERSION CONTROL OF DIGITAL OBJECTS AND METHODS OF USE THEREOF

(71) Applicant: American Express Travel Related Services Company, Inc., New York, NY (US)

(72) Inventors: Himanshu S. Bhatt, Bengaluru (IN); Shourya Roy, Bangalore (IN); Harvey R. Raymundo, Coral Springs, FL (US); Paridhi Jain, Bangalore (IN); Heather A. Cole, New York, NY (US); Sarah A. Sharma, Pembroke Pines, FL (US); Christine Malczanek, New York, NY (US); Rohit Bhiogade, Boisar (IN)

(73) Assignee: American Express Travel Related Services Company, Inc., New York, NY (US)

( * ) Notice: Subject to any disclaimer, the term of this patent is extended or adjusted under 35 U.S.C. 154(b) by 256 days.

(21) Appl. No.: 16/704,433

(22) Filed: Dec. 5, 2019

(51) Int. Cl.
*G06K 9/62* (2022.01)
*G06N 20/00* (2019.01)
*G06F 40/194* (2020.01)
*G06F 16/18* (2019.01)
*G06V 30/418* (2022.01)

(52) U.S. Cl.
CPC ....... *G06K 9/6215* (2013.01); *G06F 16/1873* (2019.01); *G06F 40/194* (2020.01); *G06N 20/00* (2019.01); *G06V 30/418* (2022.01)

(58) Field of Classification Search
None
See application file for complete search history.

(56) References Cited

U.S. PATENT DOCUMENTS

| 2019/0205402 A1* | 7/2019 | Sernau | G06F 16/24575 |
| 2021/0049158 A1* | 2/2021 | Jiao | G06F 16/243 |
| 2021/0089822 A1* | 3/2021 | Baek | G06K 9/6277 |
| 2021/0157975 A1* | 5/2021 | Gelosi | G06F 40/137 |

* cited by examiner

Primary Examiner — Dov Popovici
(74) Attorney, Agent, or Firm — Sterne, Kessler, Goldstein & Fox P.L.L.C.

(57) ABSTRACT

In some embodiments, a version control system receives a first version of a digital object and a second version of the digital object. The version control system extracts data from the first version of the digital object, and data from the second version of the digital object. The version control system utilizes a categorization machine learning model to generate structured representations of the first digital object and a second digital object. The version control system identifies differences between the two digital objects and utilizes a natural language technique to produce pseudo-instructions representing an update request. The version control system validates differences between the two digital objects and sends an auto-validation report to a client computing device when the differences are compliant with the pseudo-instructions.

18 Claims, 16 Drawing Sheets

700

701

```
"1": { "page_details": [
  703  {
  705    "block_ID": "1_1",
  707    "text": "REWARD EMPLOYEES ON THE GO \n WITH  PREMIUM STATUS \n",
  709    "bbox": [ 110, 90, 1688, 654 ],
  711    "block_type" : "Message",
         "block_identifier" : "12634"
         },
         {
         "block_ID": "1_2",
         "text": "Best Rewards Plan    Corporate premium product can get access to an elevated suite of benefits and solutions ",
         "bbox":  [ 205, 1490, 1688, 1887 ],
         "block_type" : "Incentive Claim",
         "block_identifier" : "12634"
         },

{},{},....

{
         "block_ID": "1_5",
         "text": "This company relies on accurate data to identify fee purchases. If after four weeks you do not see a cred for a US dollar contact us. ",
         "bbox": [ 80, 3590, 1488, 3854 ],
         "block_type" : "Footnote",
         "block_identifier" : "12634"
         }
    ],
    "pdf_width": "4001", "pdf_height": "2250"
  }
}
```

| Error Comment 1201 | Pseudo-instruction 1203 |
|---|---|
| Per AAC: Needs to say Car Rental Loss and Damage Insurance | Per AAC: Needs to say x0; {x0: "Car Rental Loss and Damage Insurance"} |
| Please change footnote "6" to footnote symbol "5" after the offer. | Please change x2 to x3 after the offer. {x2:"footnote 6 , x3:"footnote symbol 5"} |
| Per BID 1974-project clear…need to update the copyright line to read as YYYY American Express National Bank.—Please Note: All rights reserved was also removed as it is no longer needed. | (B) Per BID 1974-project clear…need to update the copyright line to x0; {x0: "YYYY American Express National Bank"} |

COMPUTER-BASED SYSTEMS CONFIGURED FOR MACHINE LEARNING VERSION CONTROL OF DIGITAL OBJECTS AND METHODS OF USE THEREOF

BACKGROUND OF TECHNOLOGY

Computer-based version control systems operating on digital objects may flag numerous false or spurious differences among digital objects because of the inherit complexity of digital objects and their organization. Version control systems can sometimes be inaccurate, resource intensive, and represent a complex problem.

SUMMARY OF DESCRIBED SUBJECT MATTER

In some embodiments, the present disclosure provides examples of technically improved computer-based system/method/apparatus that includes at least the following components/steps of an example of a version control system that receives a first version of a digital object and a second version of the digital object. The first version of the digital object includes metadata of an update request. The version control system extracts data from the first version of the digital object, and data from the second version of the digital object. The version control system utilizes a categorization machine learning model to generate a first structured representation of the first digital object and a second structured representation of the second digital object. The version control system identifies differences between the first digital object and the second digital object and utilize a natural language technique to produce pseudo-instructions representing the update request. The version control system validates differences between the first version of the digital object and the second version of the digital object when the differences are compliant with the pseudo-instructions. The version control system sends an auto-validation report to a client computing device.

In some embodiments, when a difference between the two digital objects is not compliant with the pseudo-instructions, version control system sends an auto-validation report including a non-complaint message to a client computing device. Such a non-compliant message can include highlights or other indications of a location in the second digital object where a difference is not compliant with the pseudo-instructions.

In some embodiments, the non-compliant message can include an indication of an additional data item included in the second digital object and not requested in the update request, and an indication of missing data item excluded in the second digital object and included in the update request.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

FIGS. 1-16 show one or more schematic flow diagrams, certain computer-based architectures, and/or screenshots of various specialized graphical user interfaces which are illustrative of aspects of at least some embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 16 illustrate systems and methods for version control systems based on machine learning techniques. The following embodiments provide technical solutions and/or technical improvements that overcome technical problems, drawbacks and/or deficiencies in the technical field of version control systems. As explained in more detail, below, technical solutions and/or technical improvements herein include aspects of improved media version control systems. Moreover, various practical applications of the disclosed technology are also described, which provide further practical benefits to users and operators that are also new and useful improvements in the art.

Figure 1:
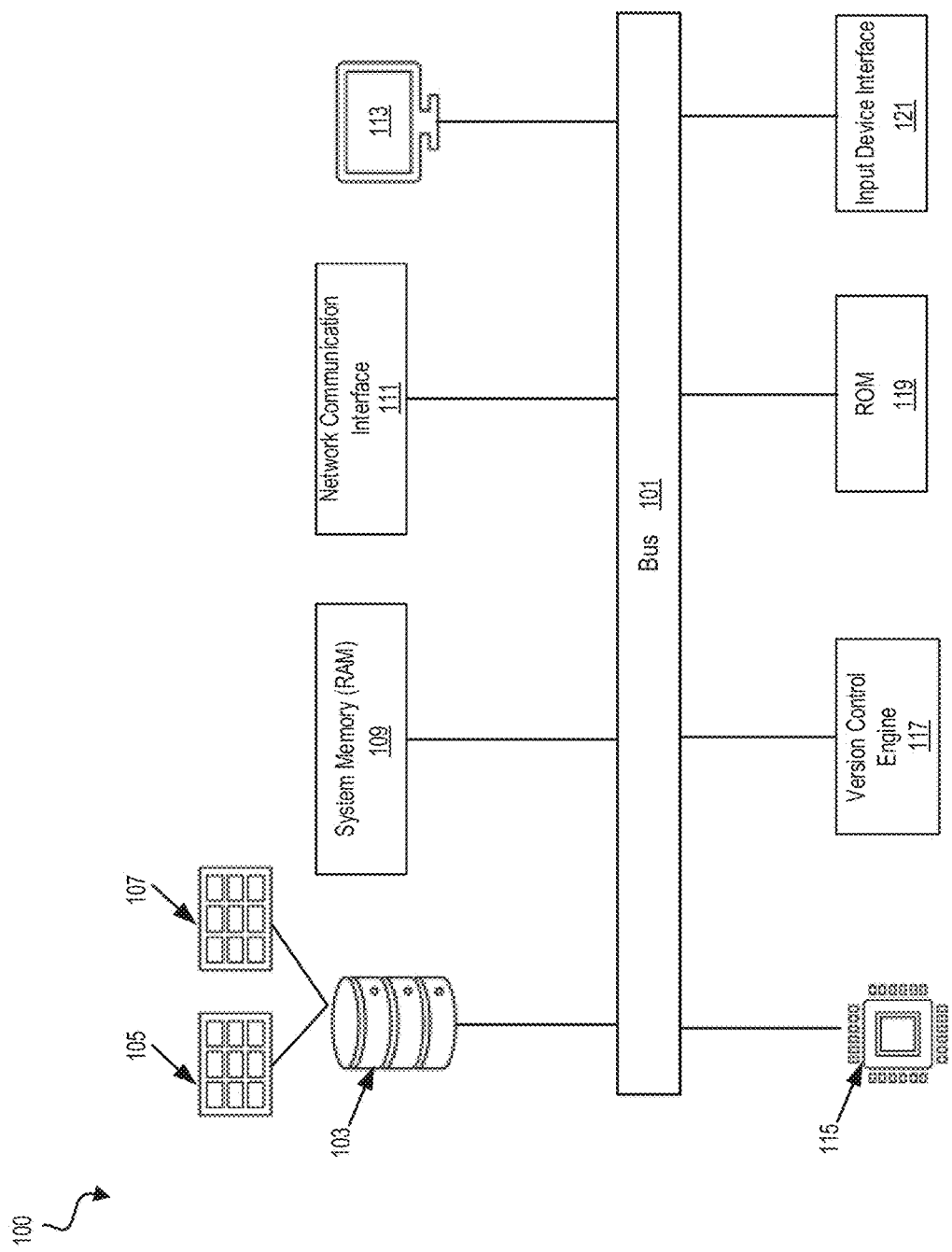

FIG. 1 illustrates an example of an implementation of a version control system, in accordance with one or more embodiments of the present disclosure. In some embodiments, an example of a version control system 100 can include a communication bus 101, a processor 115, a system memory (RAM) 109, a read-only memory (ROM) 119, a database or storage device 103, an input device interface 121, an output device interface such as display 113, and a network communication interface 111.

In some embodiments, the communication bus 101 collectively represents system, peripheral, and/or chipset buses that communicatively connect the numerous internal devices of the example of the version control system 100. The communication bus 101 may be a physical interface for interconnecting the various components, however in some embodiments, the communication bus 101 may be a network interface, router, switch, or other communication interface.

In some embodiments, the example of the version control system 100 may receive and/or store multiple media, datasets or records, for example, media, datasets or records 105 and 107. Media, datasets or records 105 and 107 can include media compliance standards, regular expression rules, structured and/or unstructured media associated with one or more users, or non-person entities such as commercial entities, including merchants, industrial entities, firms and businesses, governmental organizations or other suitable non-person entities. The various components of the example of the version control system 100 may interoperate to detect, predict, and/or infer differences in patterns associated with, for example, digital content, creative media, or other suitable media created for digital platforms, and/or distributed digitally to reach users or non-person entities through the version control engine 117 discussed below with respect to FIG. 2.

In some embodiments, the example of the version control system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of the example of the version control system 100.

In some embodiments, a database or storage device 103 stores datasets or records 105 and 107 including, for example, media compliance standards, regular expression rules, structured and/or unstructured media, and other suitable data or data structures utilized by the version control system 100. The datasets or records 105 and 107 can likewise include variables associated description of media, for example, tags, metadata, placeholders, text, or other suitable data. In some implementations the database or storage device 103 can be part of a marketing system, financial institution system, merchant system, online store system, or other suitable system that can integrate the example of the version control system 100. One or more components of the example of the version control system 100 can communicate with database or storage device 103 via, e.g., the communication bus 101 to retrieve datasets or records 105 and 107 in real-time or near real-time. Accordingly, the example of the version control system 100 can determine differences between different versions of rich media in real-time or near real-time. In some instances, the example of the version control system 100 differences between digital objects on demand, in response to a user or system request, for example in real-time or near-real time. As described herein a digital object can referred to a digital document, a media object, a multimedia object, and other suitable types of digital objects.

In some embodiments, a user or administrator may interact with the example of the version control system 100 via a display 113 and a user input device interface 121. The input device interface 121 may include, e.g., a mouse, a keyboard, a touch panel of the display 113, motion tracking and/or detecting, a microphone, an imaging device such as a digital camera, among other input devices. In some implementations, results and statuses related to the example of the version control system 100 and operations thereof may be displayed to the user via the display 113 or sent to another computing device not shown in FIG. 1. Some examples of such results can include holistic comparison between different media version objects, selective comparisons between different versions of media objects, localized comments included in different versions of media objects, validation reports associated with version control of different media objects, and other suitable types of results or outputs.

As shown in FIG. 1, communication bus 101 can also couple the example of the version control system 100 to a network (e.g., network 1607 shown in FIG. 16) through a network communication interface 111. In this manner, the example of the version control system 100 can be part of a network of computers (for example a local area network ("LAN"), a wide area network ("WAN"), or an Intranet, or a network of networks, for example the Internet. Any or all components of the example of the version control system 100 can be used in conjunction with the subject technology.

Figure 2:
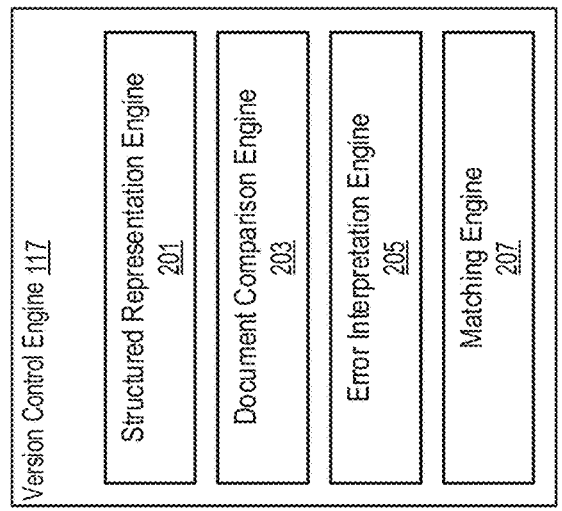

FIG. 2 illustrates internal devices of an example of a version control engine, in accordance with one or more embodiments of the present disclosure. In some embodiments, the example of the version control engine 117 can include one or more engines that implement one or more machine learning models including a structured representation engine 201, a document comparison engine 203, an error interpretation engine 205, and a matching engine 207.

In some embodiments, the structured representation engine 201 produces structured representations of media objects including relevant textual components along with meta-information about the content such as, structural position, relative ordering, content type, and unique content identifiers or other suitable type of structured representations. For instance, the structured representations of two versions of media objects can facilitate comparing media content while being agnostic to the constrain of having the corresponding content across the media objects on, for example, a same page number or following the same relative ordering. Further computations executed by the structured representation engine 201 are discussed below with reference to FIG. 4.

In some embodiments, the document comparison engine 203 identifies differences across structured representations of different versions of media objects. Such structured representations can be validated against, for example, one or more error comments or update requests. In some instances, the document comparison engine 201 compares structured representations of different versions of media objects in an agnostic manner, that is, the comparison is agnostic to changes in the media objects layout or relative ordering of textual components. In some instances, the document comparison can map or associate different media components across different versions of a media object and compare the mapped or associated media components. Further computations executed by the document comparison engine 203 are discussed below with reference to FIG. 8.

In some embodiments, the error interpretation engine 205 applies one or more natural language techniques to interpret, for example, error comments, update requests or other suitable types of text. In some instances, the error interpretation engine 205 can apply one or more of an automatic summarization technique, a morphological segmentation technique, a word sense disambiguation technique (e.g., sentence boundary disambiguation), word segmentation, template-based generation technique, rule-based generation technique, and other suitable natural language generation techniques. Thereafter, the error interpretation engine 205 can produce a set of pseudo-instructions based on the interpretation of natural language. Such pseudo-instructions can be utilized by the comprehension engine as discussed below with reference to FIG. 13. Further computations executed by the error interpretation engine 205 are discussed below with reference to FIG. 11.

In some embodiments, the matching engine 207 processes the actionable pseudo-instructions produced by the error interpretation engine 205 and the differences across structured representations of different versions of media objects identified by the document comparison engine 203 to validate cause and effect relations between different versions of media objects and generates a validation report. In some instances, when the difference across structured representations of different versions of media objects do not map to one or more pseudo-instructions the matching engine 207 can output a notification message to a user. Further computations executed by the matching engine 207 are discussed below with reference to FIG. 13.

Figure 3:
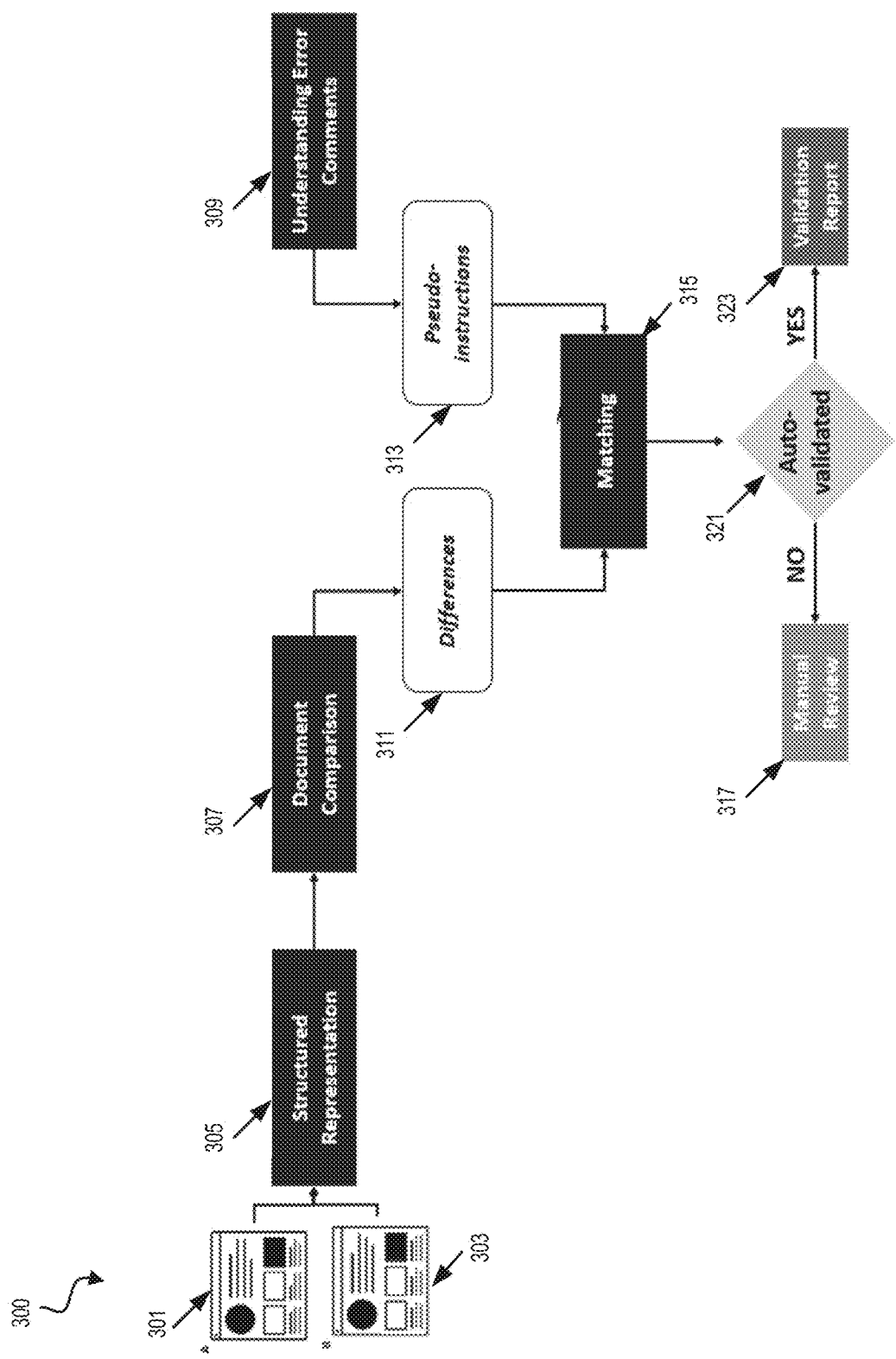

FIG. 3 illustrates a block diagram of an example of a version control system, in accordance with one or more embodiments of the present disclosure. In some implementations, the example of the version control system 100 receives a first version of a media object 301 and a second version of a media object 303. In some instances, the second version of the media object 303 can be a revised version of media object 301 including metadata related to an update response. In some implementations, the structured representation 305 produces structured representations of the first version of media object 301 and the second version of media object 303. Thereafter, the document comparison 307 identifies differences between the first version of media object 301 and the second version of media object 303 based on their corresponding structured representations, such differences are exemplified at 311.

In some embodiments, the example of the version control system 100 interprets or understands at 309 error comments, or update request made with respect to the first version of media object 301 and based on such interpretation produces a set of pseudo-instructions as shown at 313. Thereafter, the example of the version control system 100 executes a matching process and maps differences identified between the first version of the media object 301 and the second version of the media object 303 with the set of pseudo-instructions as shown at 315. In some instances, when one or more of the differences 311 map to one or more of the pseudo-instructions 313 the example of the version control system 100 can perform an automated validation as shown at 321 and produce a validation report shown at 323. In some other instances, when there is no match between one or more differences and one or more pseudo-instructions, the example of the version control system 100 can send a notification message to a user indicating that a manual review may be required as shown at 317.

Figure 4:
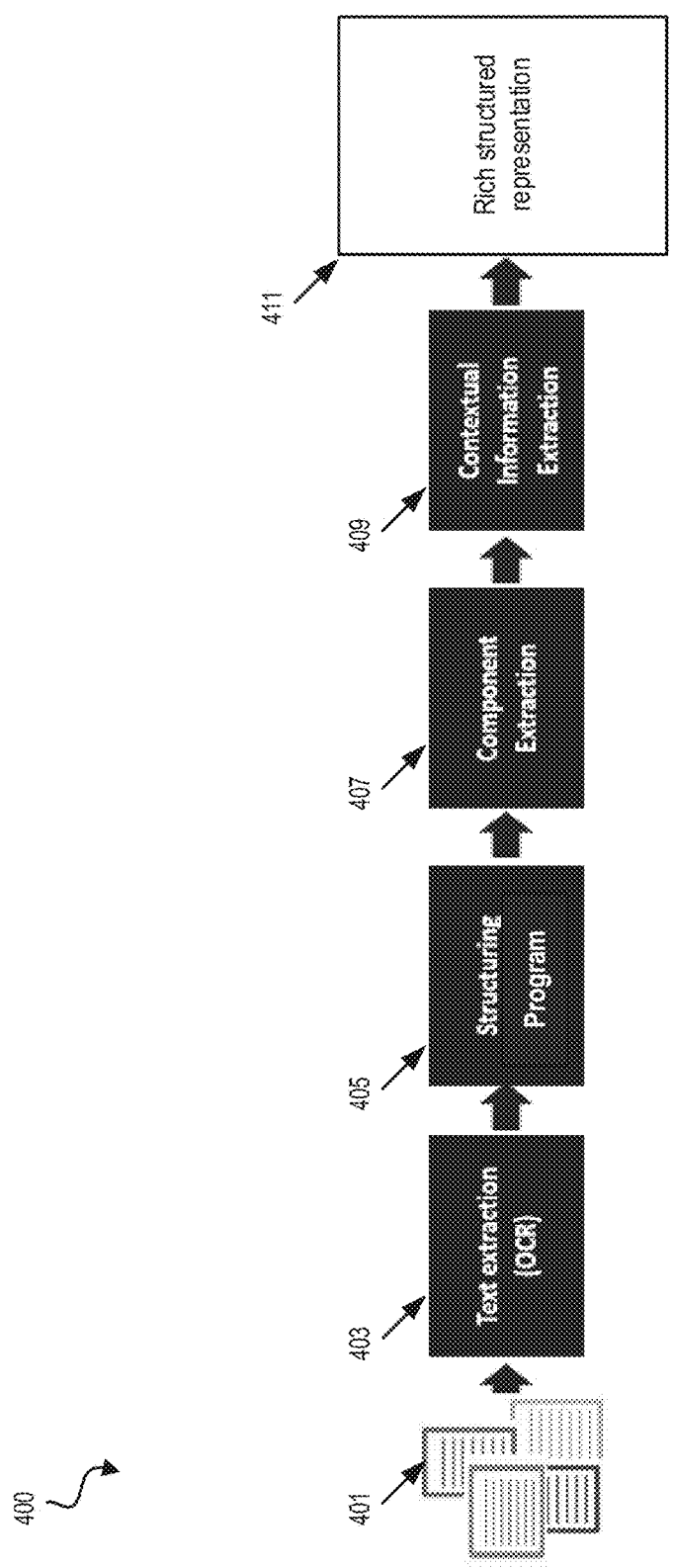

FIG. 4 illustrates examples of computations executed by a structural representations engine, in accordance with one or more embodiments of the present disclosure. In some implementations, the structural representation engine 201 digitalizes or transforms versions of media objects such that the extracted information from such version of media objects can be further processed by the example of the version control system 100. The structural representation engine 201 generates a rich structure representation of media objects including individual textual components of media objects, structural and positional information of media objects along with additional meta-information of media objects which enables better control on media objects for different kind of processes.

In some embodiments the structural representation engine 201 receives a set of multiple types of documents as shown at 401. Such set of multiple documents can include PDFs files, scanned images with different layouts, templates, or other suitable media objects. Thereafter, the structural representation engine 401 can extract raw text and bounding boxes from the documents 401 as shown at 403. The output of the text extraction 403 serves as input to the structuring program 405. The structuring program 405 imposes structure to the extracted raw text using special coordinates to preserve a media object layout. The output of the structuring program 405 serves as input to the component extraction 407. The component extraction 407 can derive individual components, merges or splits individual components extracted based on their relative order. The output of the component extraction 407 serves as input to the contextual information extraction 409. The contextual information extraction 409 extracts from the processed media object content specific information depending on case by case basis depending on the application. Such a contextual information can include, for example, content category, domain specific tags, and other suitable contextual information as shown in rich structural representation 411 including multiple structural and contextual aspect of the document.

Figure 5:
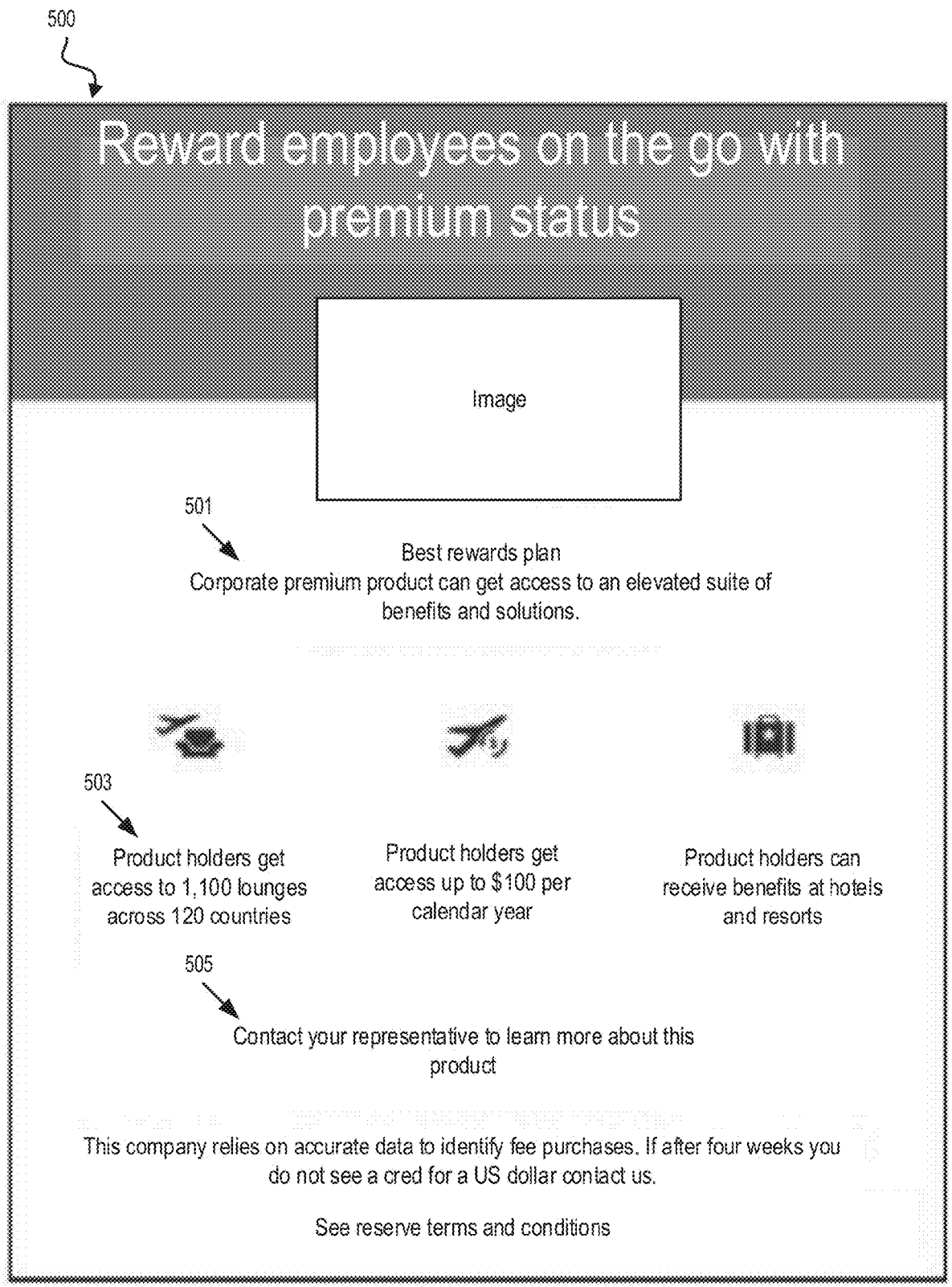

FIG. 5 illustrates an example of a version of a media object, in accordance with one or more embodiments of the present disclosure. The version of the media object 500 shown in FIG. 5 is a representation of a media object containing multiple textual sentences arranged at different parts of the media object representation. For example, text sentence 501, text sentence 503, and text sentence 505. In some instances, media object 500 can be part of the input to the example of the version control system 100. More specifically, can be an input to the text extraction 403 discussed above with respect to FIG. 4.

Figure 6:
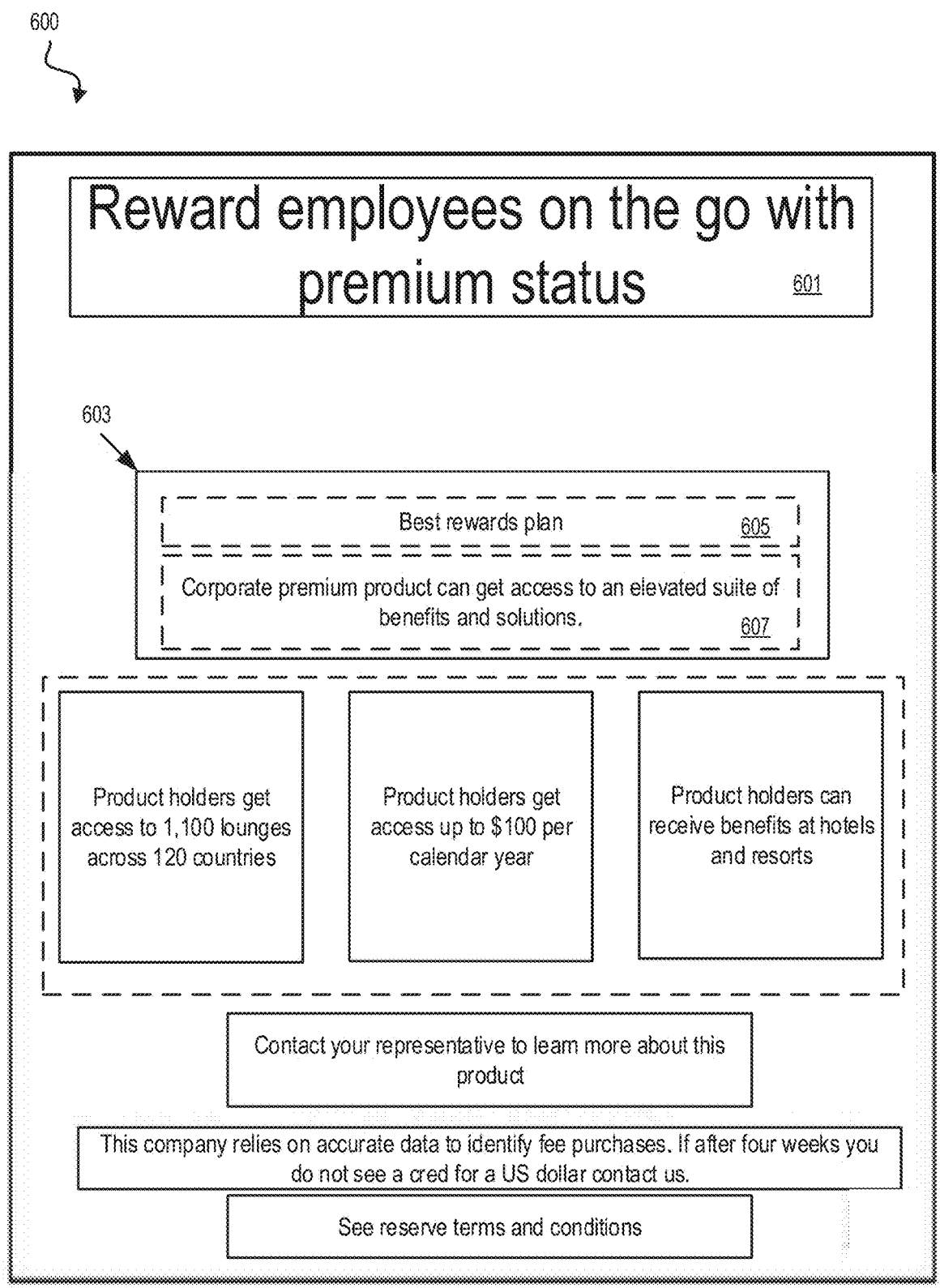

FIG. 6 illustrates an example of a media objects components processed during the intermediate computations of the example of the virtual control system, in accordance to one or more embodiments of the present disclosure. Media component 600 shows different blocks of text (e.g., 605 and 607), such blocks of text can be computed utilizing coordinates of bounding boxes such a bounding box 603. In some implementations, individual components can be extracted utilizing special coordinates. In some implementations, spatially nearby individual component can be further merged or split based on the proximity to preserve the original layout of the media object.

FIG. 7 illustrates an example of structured representation of media object components, in accordance with one or more embodiments of the present disclosure. In some implementations, the structured representation engine 201 discussed with reference to FIG. 2 can generate a structured representation of a media a media object component such the one shown at FIG. 7.

In some embodiments, each individual component is appended to, for example a Java Script Object Notation (JSON) array or other suitable structured format where each component can be further appended with additional meta-information to form rich structured representations. Examples of such meta information can include, fields such as the text, type-text, sub-category, (Copyrights Terms and Conditions Identifier (CTC-ID), block-ID, bounding-box or other suitable fields. Multiple tags computed for each JSON block such examples are further discussed below:

Example 1: Textual Components ("\text") (shown at 705): In some instances, textual components can be produced by extracting the document text along with the spatial co-ordinates of text. For example, for native PDF documents, text and its structural location from the documents can be extracted applying voice to data techniques. For scanned documents or images, OCR 4 can extract the text in hOCR format. The hOCR format retains the co-ordinates of the bounding boxes for different blocks of text as well as for individual words within each block. The structuring program identifies the individual components using the spatial coordinates and the relative ordering i.e. what appears before and after a text block. Further, the spatially nearby individual components can be merged or split based on the meta-information such as \bbox" and \block ID" to preserve the original layout of the document.

Example 2: Spatial coordinates (\bbox) (shown at 707): In some instances, bounding boxes can be used to impose a structure on extracted text to preserve the original layout of the document. It is a bottom-up approach which the version control system, 100 organizes all words in a text block using the spatial co-ordinates of each word. In some instances, once the words within text blocks are aligned, the text blocks are then organized based on their respective spatial co-ordinates.

Example 3. Relative ordering (\block ID) (shown at 703): In some instances, /block ID represents the relative location of a text block in the order of occurrence in the document. /block ID can capture a page number and a block position at a specific page number and can be used to uniquely identify the component.

Example 4. Content type (\block type) (shown at 709): In some instances, each component represented as an element in a JSON array is also categorized as \content" v/s \auxiliary". In the context of the marketing media, "\content" can refer to information comings from the document and "\auxiliary" can refer to annotations provided on the documents.

In some implementations a classification machine learning model, can be, for example, an ensemble machine learning model such as a gradient boosting machine, random forest model, bootstrap aggregation model, stacked generalization model, gradient boosted regression tree model, radial basis function network model, or other suitable type of machine learning model. In some implementations, a gradient boosting machine model can be enabled to sequentially produce a model in the form of linear combinations or predictions by solving multi-dimensional complex optimization problems. In some implementations, a gradient boosting machine learning model can include multiple models built in a stage-wise way, thereafter the gradient boosting machine learning model can generalize the multiple models enabling an optimization of an arbitrary differential function. Thus, producing an optimized asset or software object that balances the objectives of, for example, a user and an entity associated with the asset or software object.

In some embodiments, a gradient boosted machine or other suitable classification machine learning model can be trained using past annotated data to predict a block-type based on the tokens used in the block. Each "\content" text block can be further categorized into one of the subcategories, for example, "\footnotes", "\disclosures", "\clauses", "\tabular" or other suitable subcategories. In some implementations the categorization and subcategorization described above facilitates the arrangement of a document based on the content type and enables faster document navigation, sort operations, and search operations.

Example 5. Content identifier ("block identifier") (shown at 711): In some instances, a compliant media document includes all content from a pre-approved knowledge base or database, referred to as "Copyrights, Terms Conditions" (CTC). In a CTC database, all the verbatim copyrights, terms and conditions can be organized and uniquely identified by a CTC-ID. While in some instances, creating a structured representation for a media object, the example of the version control system 100 compares the block text against the CTC and retrieves the corresponding CTC-ID for a block. In some implementations, the example of the version control system 100 can the similarity between the textual block content and the CTC verbatim along with the meta-data overlap to narrow the CTC search space.

Figure 8:
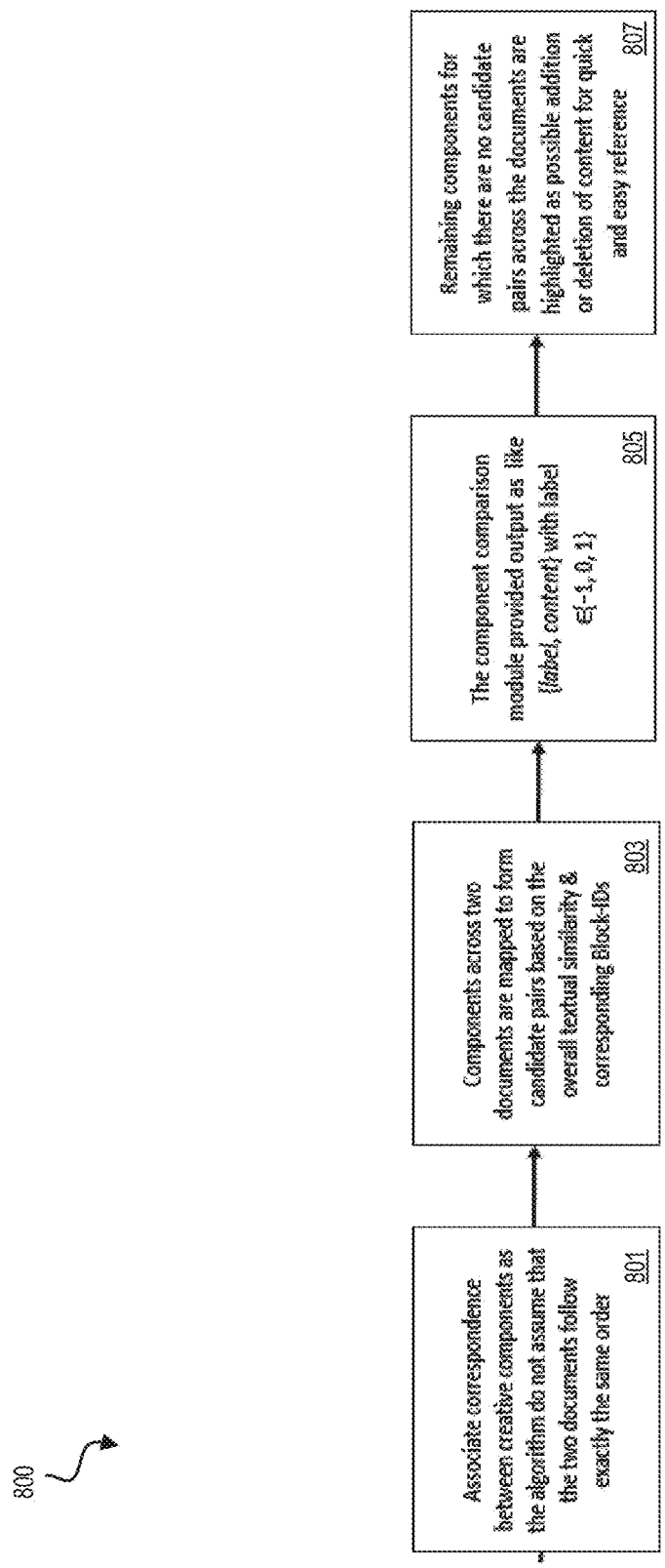

FIG. 8 illustrates examples of computations executed by an example of document comparison engine, in accordance with one or more embodiments of the present disclosure. In some implementations, the document comparison engine 203 can associate correspondences between a first version of a media object and a second version of a media object without the assumption that the two version to the media objects follow exactly or similar order as shown at 801. In some instances, the document comparison engine 203 determines that components across two different versions of a media object can be mapped based on their overall textual similarity and corresponding block-ids as shown at 803. Thereafter, the document comparison engine 203 in the format (label, content) with labels (−1,0,1) as shown at 805. In some instances, remaining components for which there are no candidate pairs across two or more media versions can be highlighted to represent possible additions or deletions of content for quick and easy reference as shown in 807.

Figure 9:
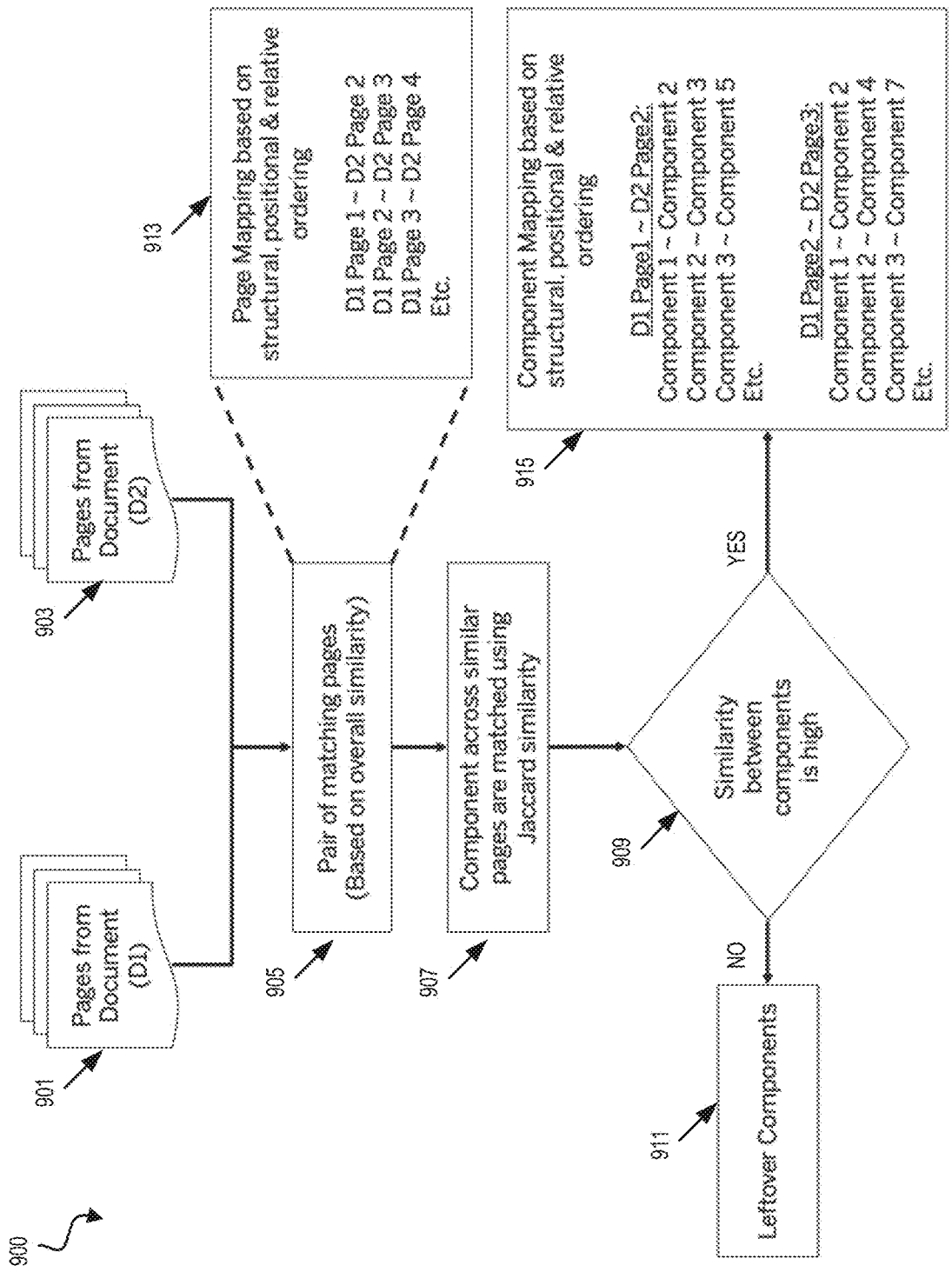

FIG. 9 illustrates examples of computations executed by an example of a document comparison engine of the example of the control version system, in accordance with one or more embodiments of the present disclosure. In some instances, the example of the document engine 203 can receive data from a first media object 901 and data from a second media object 903. At 905, the example of the comparison engine 203 pairs matching data based on overall similarity. Results from this pairing are shown at 913. It is appreciated at 913 that data from the first version of media object 901 can be matched to data from the second version of media object 903 even when such data is included in different locations, for example, different pages of the first version of media object 901 and the second version of media object 903 that is, the example of the document comparison engine is agnostic to the location where changes are made. Thereafter, components across similar pages can be matched using, for example, a Jaccard similarity technique or other suitable similarity technique as shown at 907. In some instances, when the similarity between the first version of the media component 901 and the second version of the media component 903 is high or above a predetermined threshold as shown in conditional statement 909, a component mapping based on structural, positional and/or relative ordering is produced as shown at 915. In some other instances when the similarity between one or more components is not high or above a predetermined threshold as shown in conditional statement 909, a leftover component report 911 is produced including, for example, components that are not similar or non-compliant in the first version of the media object 901 and the second version of the media object 903 or the other way around.

FIG. 10 depicts an example of an output of an example of the version control system in accordance with one or more embodiments of the present disclosure. In some embodiments, once the candidate pairs are selected, the document comparison engine 203 can compare two components of two or more versions of a media object, in this example the first version of media object 1001 and the second version of the media object 1003. In some instances, the example of the version control system 100 can display differences 1009 with an output in a format like {label; content} shown at 1005 and content shown at 1007 with label (−1,0,1). The label (0) represents overlapping content between two media version contents, the label (−1, content) represents content that present in the first media version object 1001 has been removed in the second version of the media object 1003 as shown at 1011. A label such as (1, content) indicates that content was added to the second version of the media object 1003 but such content is not included in the first version oft media object 1001 as shown at 1013.

Figure 11:
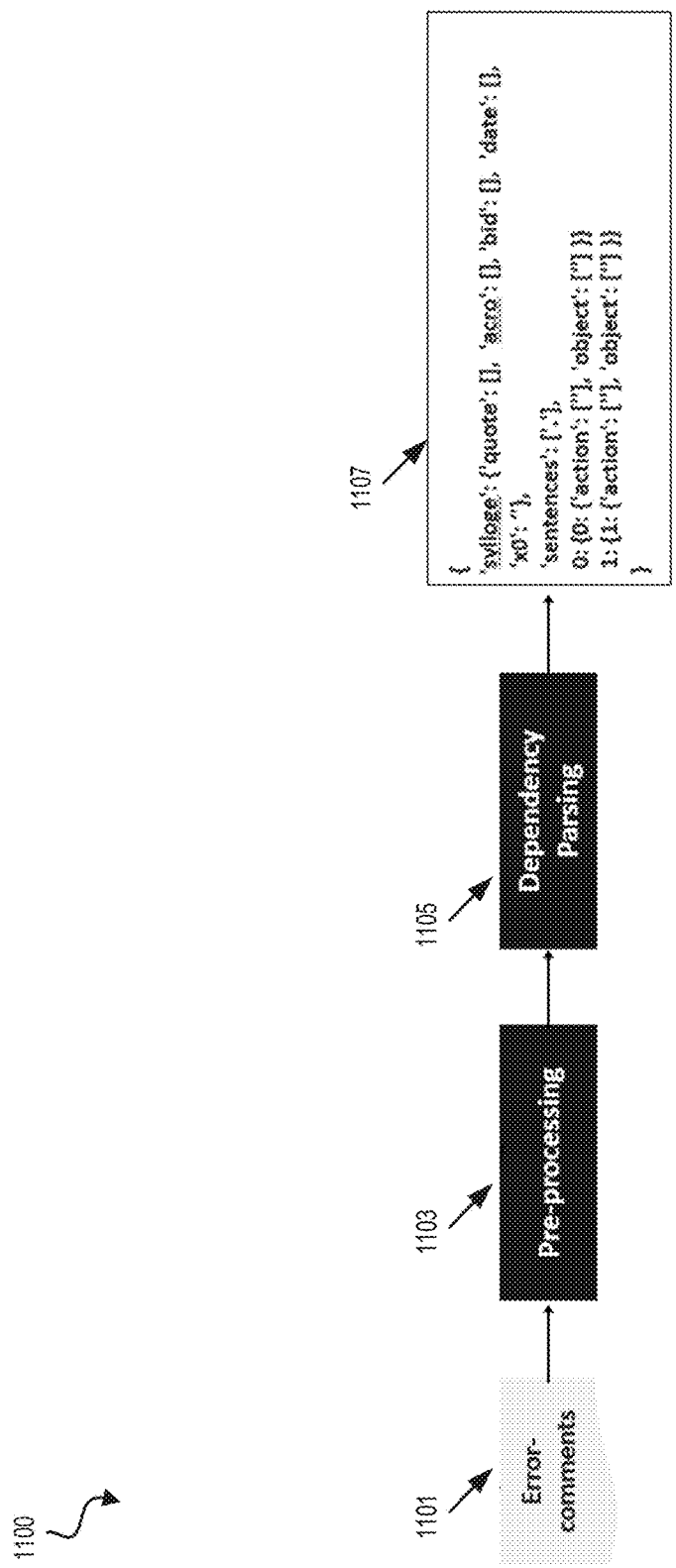

FIG. 11 depicts examples of computations executed by the example of error interpretation engine of the example of the control version system, in accordance with one or more embodiments of the present disclosure. In some implementations, error comments or update requests 1101 are pre-processed at 1103. At 1103 the example of the error interpretation engine 205 can clean or sanitized error comment or update request 1101 and prepare the error/update comment for parsing. In some instances, the example of error interpretation engine 205 can add a dummy subject or text, for example text "you" can be added to an error comments or update request that directly starts with an action verb such as "add", "remove", "change" or "update". Accordingly, this type of tagging can be executed on the correct subject rather than tagging the verb incorrectly. In some instances, the example of error interpretation engine 205 can remove details about the location of an error/update such as page #, slide #. In some instances, the example of the error interpretation engine 205 can replace footnote references, quoted text (words or phrases), block IDs, and text representing suggested changes such as "\should read as" or other suitable suggested changes. In some instances, Pleasing/polite words like "needs to be" or "should be" can be removed and the first letter of the first word in a comment can be capitalized.

In some embodiments, the example of the error interpretation engine 205 executes a dependency parser process 1105 in which each line in an error comment or update request is identified individually and extracts a dependency parse. In some instances, the dependency parser process 1105 can include the capture of syntactic relations wherein two words are associated by a directed binary grammatical relation. In some instances, a word from where an arrow originates is called the head and a word to which the arrow points is called the dependent. In some instances, a dependent word can never have two heads. However, in some instances, a head can have multiple dependent words. In some instances, head-dependent relations such as the one explained above can be used to generate a parsing tree to produce to identify semantic relationships in error comments or update requests.

In some embodiments, rules can be produced using tags and relation information of a head-dependent relations. In some instances, rules can be utilized to identify a bucket or buckets to which a dependent word belongs. In some instances, each word in a parsing tree can either be a root, a child or a parent of another word with interpretive language dependencies. For instance, a word can be a 'subject' of another word that is the root of a comment. In some instances, root post-tag can represent a main action of the comment, root dependencies such as dObj (a direct object representing a noun phrase which is the (accusative) object of the verb), conj (representing conjunctions), and nObj (representing an object of a verb) can represent on what words an action can act upon. The extracted information from unstructured free-form text—action and action to act on what entities shown at 1107 is the output of the dependency parser 1105.

FIG. 12 illustrates examples of conversion of error comments or update requests made in natural language from to pseudo-instructions, in accordance with one or more embodiments of the present disclosure. The error comments or update requests shown at 1201 are represented in natural language or text and converted into pseudo instructions 1203 to serve as input to the matching engine 207 discussed with reference to FIG. 2 above and FIG. 13 below.

Figure 13:
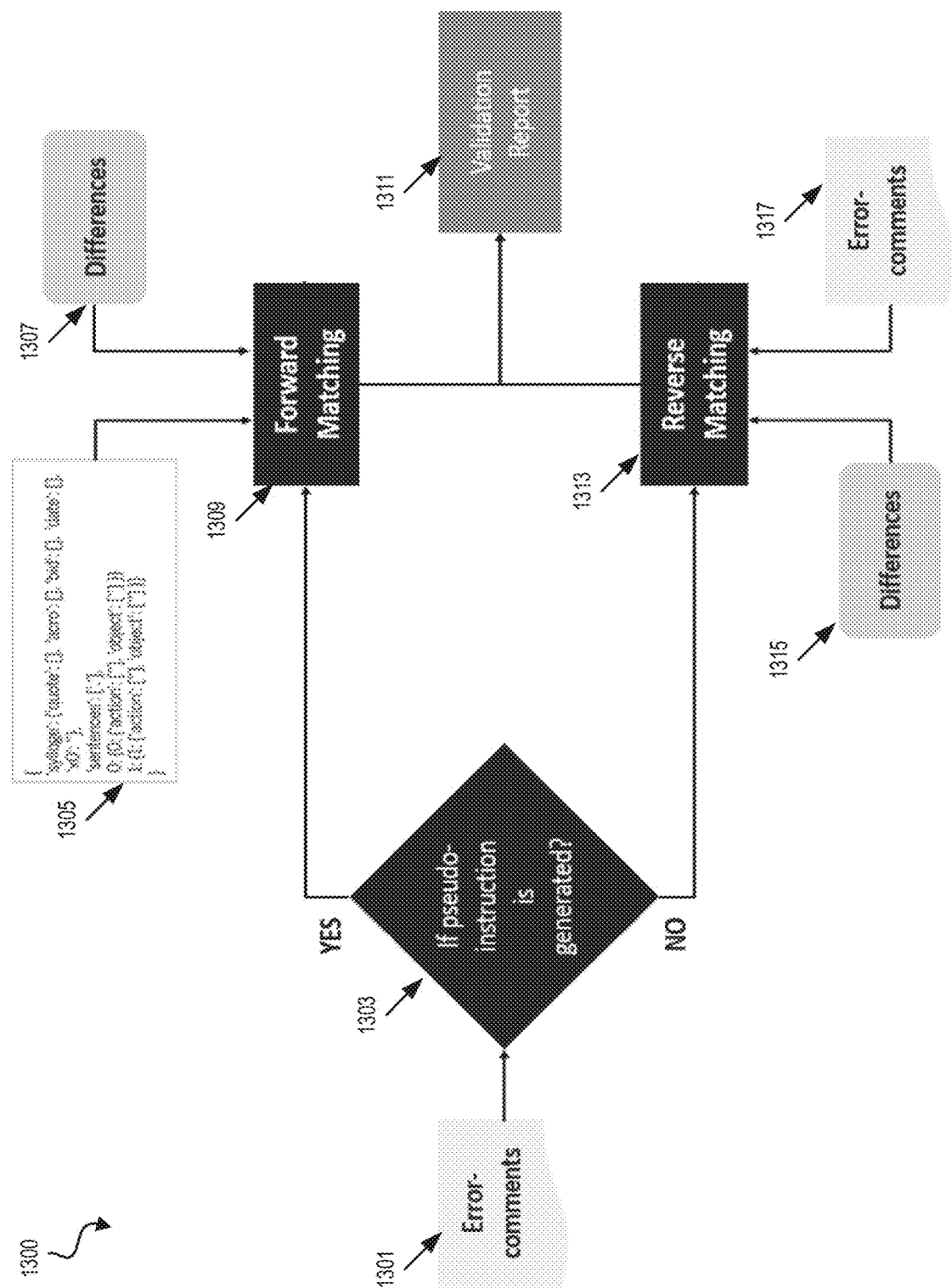

FIG. 13 illustrates examples of computations executed an example of matching engine of the example of control version system, in accordance with one or more embodiments of the present disclosure. In some instances, error comments or update request 1301 are inputted to the example of matching engine 207 and inputted to the conditional statement 1303. In some instances, when pseudo-instructions are generated for different versions of media or digital objects, the example of matching engine 207 executes a forward matching process 1309 utilizing pseudo-instructions 1305 and computed differences 1307. Thereafter, the example of matching engine 207 can produce a validation report 1311.

In some instances, the forward matching process 1309 can include utilizing the pseudo-instruction 1305 generated by parsing error comment or update request 1301 as an input and associating with differences with cause-effect relations. To establish such cause-effect relation, interpretations can be extracted from the parsed comment described below:

Quoted text representing "should read as": In some instances, the quoted text that succeeds words like "should read as", "Suggest" and similar variations are searched and matched in the newer or second version of the digital object. This process can suggest that a reviewer asked the quoted text to appear in a newer or second version of the digital object. These changes can be preceded by the label '1' and searched in the differences between different versions of digital objects, media objects and/or or multimedia objects.

Block IDs: In some instances, suggested block IDs used for references to add, for example, terms and conditions, disclosures, footnotes, or other suitable text are extended via a Copyright Terms and Condition (CTC) block database. In some instances, corresponding approved text can appear in the newer or second version of the digital object and preceded by the label '1' and searched in the differences between different versions of digital objects.

Quoted text representing CTC block content: In some instances, error comment or update requests do not include a block ID that should added in a new or second version of a digital object instead such effort comments include copies of exact content of a block to be added in the new or second version of a digital object. In some instances, text that appears in quotes but not preceded by identifying words can be searched in the new or second version of the digital object and preceded by a label '1'.

Parsed actionable verbs and objects: In some instances, a dependency parser process can be executed to interpret actions included in the error comment or update requests to for example change a content in a new or second version of a digital object. In some instances, parsed verbs implying add, delete, update and instruction to act upon digital objects are preceded by '1', '−1', and ('−1', <content to change>, '1', <content to update to>), respectively. Such interpreted actions can be searched in the set of differences found between two versions of a media content.

In some other instances, when pseudo-instructions are not generated for different versions of digital objects as shown at conditional statement 1303, the example of the matching engine 207 executes a reverse matching process 1313. In some instances, the output of the reverse matching process can compute differences for different versions of digital objects 1315, error comment or update requests with respect to different versions of digital objects 1317, a validation report 1311 or other suitable output.

In some instances, the reverse matching process 1309 can include writing comments in free-form text which can be multi-instructional, detailed, in passive voice. In such a case, the dependency parser may fail to interpret such comments and does not generate any pseudo-instructions for such comments. Such comments can be reverse-mapped to differences identified compared versions of different digital objects; for instance, if there is a long block added to terms and conditions in a new version of a media content and there exists an ambiguous comment to add "offer terms and conditions" to the digital object, the added block and the ambiguous comment can be matched.

In some instances, the reverse matching process 1309 can be applied when text differences are part of any of the non-parsed error comment or update requests also referred as sub string matching and/or context words around differences between digital objects have a high degree of overlap (e.g., above a predetermined threshold value) with comments, also referred as context with sub string matching.

In some instances, the validation report 1311 can validate differences introduced due to the actions suggested in the error comment or update requests. In some instances, the validation report 1311 can include additional information such as categorization of comments into an action-bucket i.e. \add", \remove" or \update", a confidence score representing how closely a difference maps to comments, and/or specific digital object components where change has occurred. This information facilitates a fast affirmation of a cause-effect relation between comments and differences. In some instances, the validation report 1311 can include lists of differences and the comments that could not be auto-validated. Thus, in some instances, the reverse matching process can send a message to a client computing device highlighting or identifying specific issues that need to be addressed while providing evidences to efficiently validate the remaining of a version of a digital object. In some instances such message can include elements that should be added as indicated by the update request, elements that should be removed as indicated by the update request, and elements that should be excluded because their exclusion was not indicated in the update request.

Figure 14:
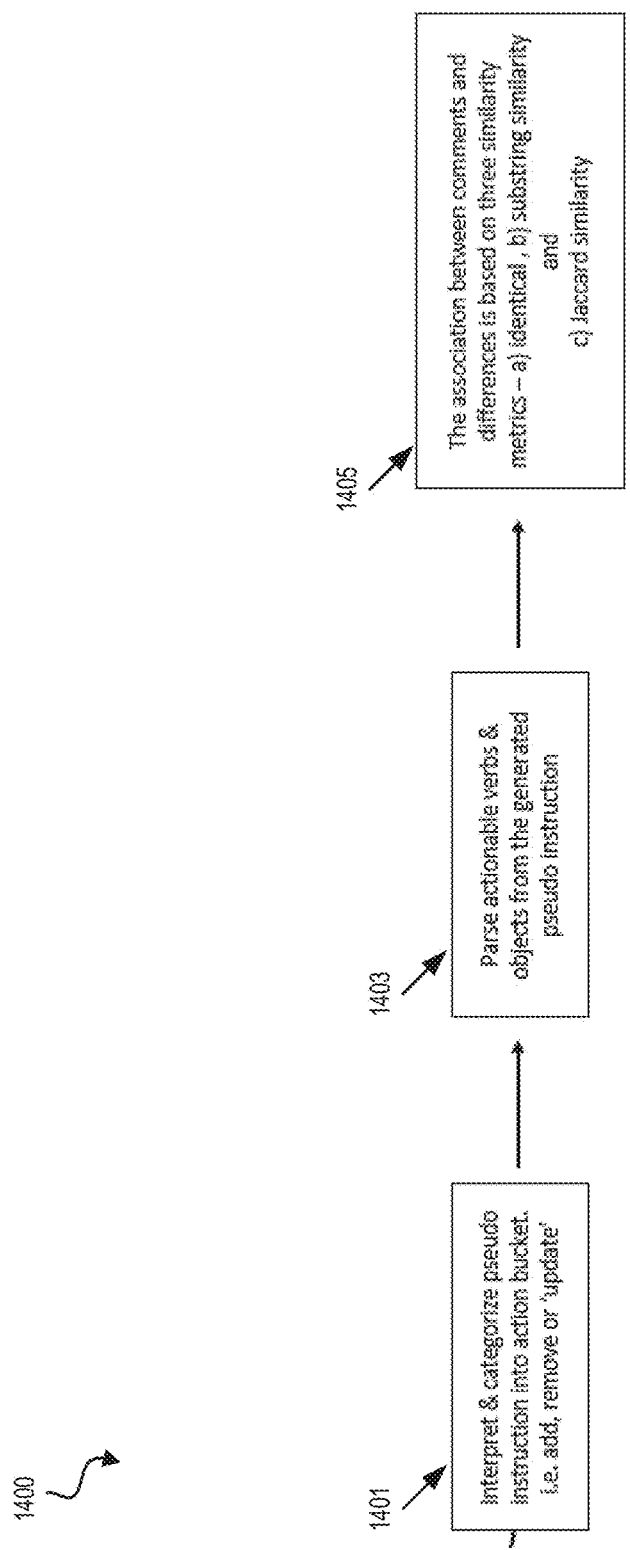

FIG. 14 illustrates examples of computations of a forward matching process executed by the example of matching engine, in accordance with one or more embodiments of the present disclosure. In some instances, the example of the matching engine 207 can interpret and categorize pseudo-instructions into action buckets as shown at 1401. Thereafter, the matching engine 207 can parse actionable verbs and objects from the generated pseudo-instructions as shown at 1403. Then, the example of the matching engine 207 can compute associations between comments and differences based on similarity metrics that can include metrics indicating identical content, metrics indicating similarity between substrings of content, Jaccard similarities, and other suitable type of similarity metrics, as shown at 1405.

Figure 15:
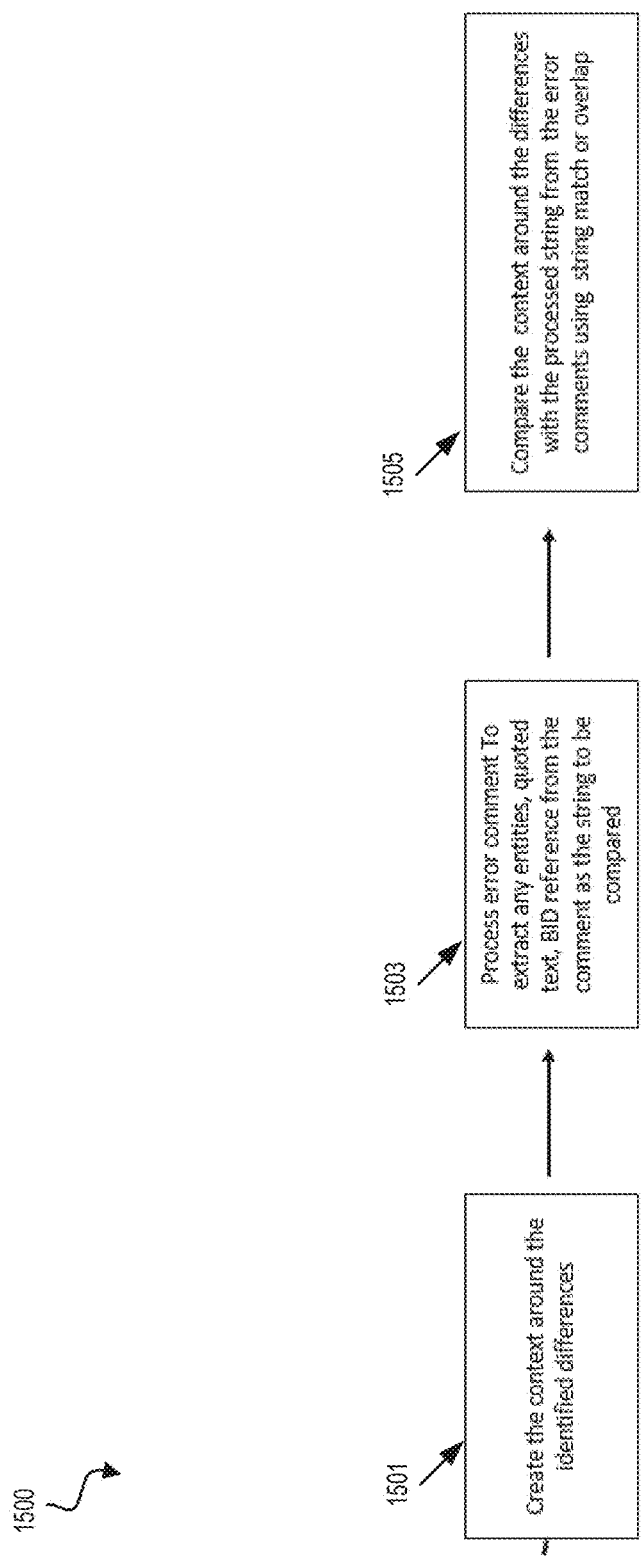

FIG. 15 illustrates examples of computations of a reverse matching process executed by the example of the matching engine, in accordance with one or more embodiments of the present disclosure. In some instances, the example of the matching engine 207 generates context around a set of identified differences as shown at 1501. Thereafter, the example of the matching engine 207 can process error comment or update requests to extract entities, quoted text, block identifier reference from comments as a string to be compared as shown at 1503. At 1505, the example of the matching engine 207 compares the context around the differences with a string processed form the error comment or update requests utilizing a string match technique or an overlap technique.

Figure 16:
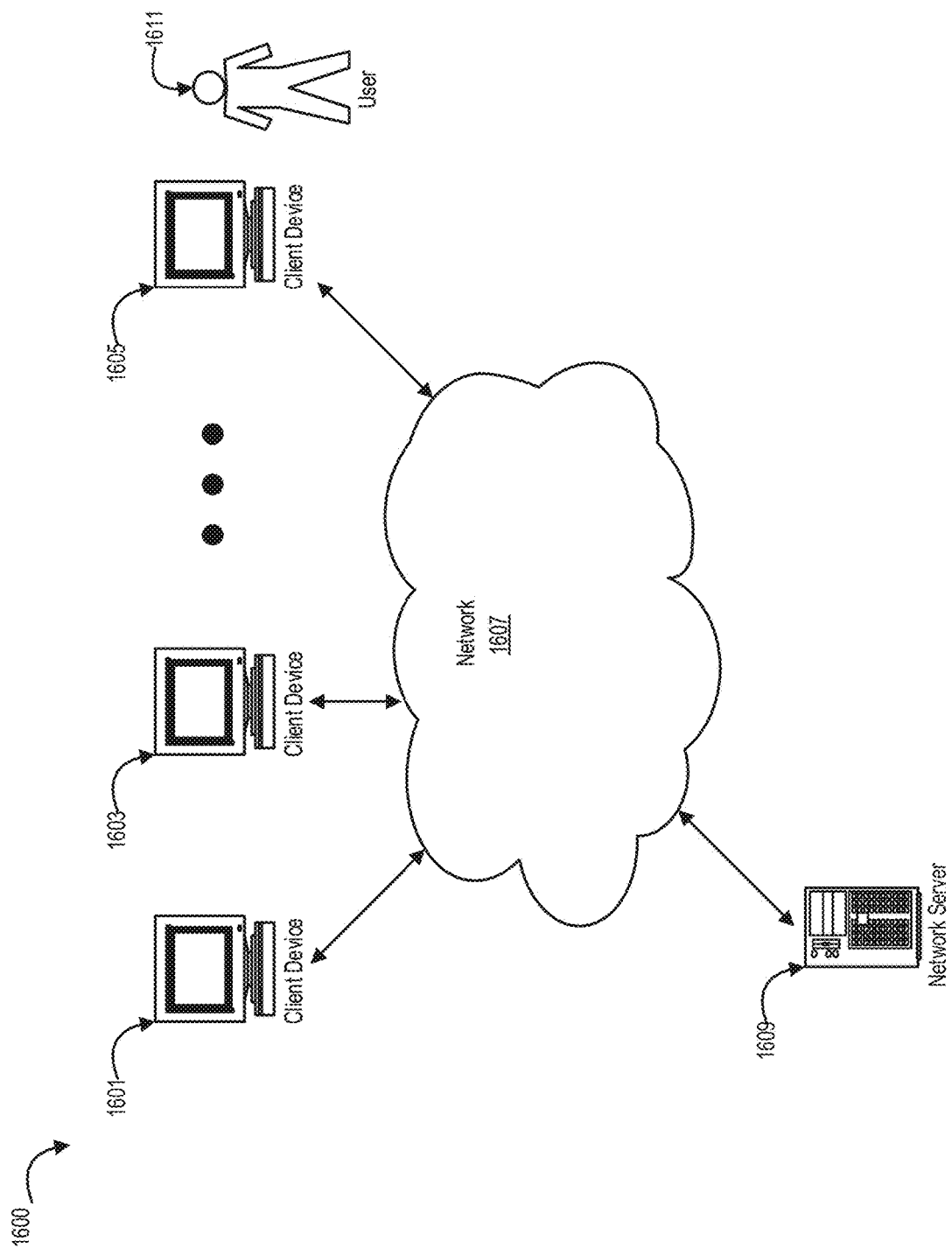

FIG. 16 depicts an example of a block diagram of an example computer-based system 1600, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the examples of computing devices and/or the computing components of the example of computer-based system 1600 may be configured to manage large numbers of members and/or concurrent request and comparison between versions of digital objects, as detailed herein. In some embodiments, the example of computer-based system 1600 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 16, members 1601, 1603, and 1605 (e.g., clients) of the example of computer-based system 1600 may include virtually any computing device capable of receiving and sending a message over a network (e.g., cloud network), such as network 1607, to and from another computing device, such as server 1609, and the like. In some embodiments server 1609 can implement the example of the version control system 100 discussed above with reference to FIG. 1. In some embodiments server 1609 can be part of a financial institution system, merchant system, online store system, marketing system, or other suitable entity. In some embodiments server 1609 can implement the database or storage device 103 discussed above with reference to FIG. 1. In some embodiments the member devices 1601, 1603, and 1605 can be used to submit (for example by user 1611) validation of changes between different version of digital objects to the example of the version control system 100. In some embodiments, the member devices 1601, 1603, and 1605 may be personal computers, multiprocessor systems, microprocessor-based or programmable consumer electronics, network PCs, and the like. In some embodiments, one or more member devices within member devices 1601, 1603, and 1605 may include computing devices that typically connect using a wireless communications medium such as cell phones, smart phones, pagers, radio frequency (RF) devices, infrared (IR) devices, Cellular Broadcast (CB), integrated devices combining one or more of the preceding devices, or virtually any mobile computing device, and the like. In some embodiments, one or more member devices within member devices 1601, 1603, and 1605 may be devices that are capable of connecting using a wired or wireless communication medium such as, wearable computer, a laptop, tablet, desktop computer, a netbook, a video game device, a pager, a smart phone, an ultra-mobile personal computer (UMPC), and/or any other device that is equipped to communicate over a wired and/or wireless communication medium. In some embodiments, one or more member devices within member devices 1601, 1603, and 1605 may run one or more applications, such as Internet browsers, mobile applications, voice calls, video games, videoconferencing, and email, among others. In some embodiments, one or more member devices within member devices 1601, 1603, and 1605 may be configured to receive and to send web pages, and the like. In some embodiments, a specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1601, 1603, and 1605 may be specifically programmed by either Java, .Net, QT, C, C++ and/or other suitable programming language. In some embodiments, one or more member devices within member devices 1601,

1603, and 1605 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 1607 may provide network access, data transport and/or other services to any computing device coupled to it. In some embodiments, the network 1607 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 1607 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1607 may include and implement, as an alternative or in conjunction with one or more of the above, a WiMAX architecture defined by the WiMAX forum. In some embodiments and, optionally, in combination of any embodiment described above or below, the network 1607 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 1607 may be transmitted based at least in part on one of more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1607 may also include mass storage, such as Network Attached Storage (NAS), a Storage Area Network (SAN), a Content Delivery Network (CDN) or other forms of computer or machine-readable media.

In some embodiments, the server 1609 may be a web server (or a series of servers) running a network operating system. In some embodiments, the server 1609 may be used for and/or provide cloud and/or network computing. Although not shown in FIG. 16, in some embodiments, the server 1609 may have connections to external systems like email, SMS messaging, text messaging, ad content providers, etc.

In some embodiments, the server 1609 may be specifically programmed to perform, in non-limiting example, as authentication servers, search servers, email servers, social networking services servers, Short Message Service (SMS) servers, Instant Message (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 1601, 1603, and 1605.

In some embodiments and, optionally, in combination of any embodiment described above or below, for example, one or more computing member devices 1601, 1603, and 1605, the server 1609, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

As used herein, the terms "computer engine" and "engine" identify at least one software component and/or a combination of at least one software component and at least one hardware component designed/programmed/configured to interact with other software and/or hardware components and/or compute system outputs.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

As used herein, term "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by a hardware of one type running (Operating System) OS of one type may emulate hardware of a different type and/or an OS of a different type, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

At least some aspects of the present disclosure will now be described with reference to the following numbered clauses.

1. An apparatus, comprising:
   a processor;
   and a non-transitory memory storing instructions which, when executed by the processor, causes the processor to:
      receive a first version of a digital object and a second version of the digital object wherein the first version of the digital object comprises a first metadata associated with at least one update request related to the digital object and wherein the second version of the digital object comprises a second metadata associated with at least one update response related to the digital object;

extract a first plurality of data items from the first metadata, and a second plurality of data items from the second metadata, utilize a categorization machine learning model to generate a first structured representation object generated based on the first plurality of data items, and a second structured representation object generated based on the second plurality of data items; and identify at least one difference between the first structured representation object and the second structured representation object.

2. The apparatus of clause 1, wherein the non-transitory memory storing instructions which, when executed by the processor, further causes the processor to:

utilize a natural language processing technique to produce at least one pseudo-instruction representing the at least one update request related to the digital object;

validate the at least one difference between the first version of the digital object and the second version of the digital object when the at least one difference is compliant with the at least one pseudo-instruction; and send an auto-validation report comprising the validation of the at least one difference to a client computing device.

3. The apparatus of any of the clauses 1 to 2, wherein the at least one difference is a first difference and the at least one pseudo-instruction is a first pseudo-instruction and, wherein at least one second difference is not compliant with at least one second pseudo-instruction and, wherein the processor sends an auto-validation report comprising a non-complaint message to the client computing device.

4. The apparatus of any of the clauses 1 to 3, wherein the non-compliant message indicates a location in the second version of the digital object where the at least one second difference is not compliant with the at least one second pseudo-instruction.

5. The apparatus of any of the clauses 1 to 4, wherein the non-compliant message comprises an indication of an additional data item comprised in the second version of the digital object and not comprised in the at least one update request, and an indication of a missing data item from the second version of the digital object comprised in the update response.

6. The apparatus of any of the clauses 1 to 5, wherein the indication of the additional data item comprised in the second version of the digital object and not comprised in the at least one update request comprises an unrequested digital item comprised in the second version of the digital object, and wherein the indication of the missing data from the second version of the digital object comprises a requested digital item comprised in the at least one update request.

The apparatus of clause 2, wherein validate the at least one difference between the first version of the digital object and the second version of the digital object is agnostic to a location within the second version of the digital object where the difference is compliant with the at least one pseudo-instruction.

8. The apparatus of clause 1, wherein the first structured representation object and the second structured representation object comprise at least one of a spatial coordinate of a text of a version of a digital object, a layout of a version of the digital object, a relative location of a text block in order of occurrence in a version of the digital object, a predicted category of a content of the version of the digital content, a unique identifier of a content within the version of the digital object.

9. The apparatus of clause 1, wherein the first version of the digital object is a first version of a media object, and the second version of the digital object is a second version of the media content.

10. The apparatus of clause 1, identify at least one difference between the first structured representation object and the second structured representation object based on metrics comprising metrics indicating identical content, metrics indicating similarity between substrings of content, or Jaccard similarities.

11. A method comprising:

receiving by a processor, a first version of a digital object and a second version of the digital object wherein the first version of the digital object comprises a first metadata associated with at least one update request related to the digital object and wherein the second version of the digital object comprises a second metadata associated with at least one update response related to the digital object;

extracting by the processor, a first plurality of data items from the first metadata, and a second plurality of data items from the second metadata, utilizing by the processor, a categorization machine learning model to generate a first structured representation object generated based on the first plurality of data items, and a second structured representation object generated based on the second plurality of data items; and identifying by the processor, at least one difference between the first structured representation object and the second structured representation object.

12. The method of clause 11, further comprises:

utilizing by the processor, a natural language processing technique to produce at least one pseudo-instruction representing the at least one update request related to the first version of the digital object;

validating by the processor, the at least one difference between the first version of the digital object and the second version of the digital object when the at least one difference is compliant with the at least one pseudo-instruction; and sending by the processor an auto-validation report comprising the validation of the at least one difference to a client computing device.

13. The method of any of clauses 11-12, wherein the at least one difference is a first difference and the at least one pseudo-instruction is a first pseudo-instruction and wherein, at least one second difference is not compliant with at least one second pseudo-instruction and wherein the processor sends an auto-validation report comprising a non-complaint message to the client computing device.

14. The method of any clauses 11 to 13, wherein the non-compliant message highlights or indicates a location in the second version of the digital object where the at least one second difference is not compliant with the at least one second pseudo-instruction.

15. The method of any clauses 11 to 14, wherein the non-compliant message comprises an indication of an additional data item comprised in the second version of the digital object and not comprised in the at least one update request, and an indication of a missing data item from the second version of the digital object comprised in the update response.

16. The method of any clauses 11 to 15, wherein the indication of the additional data item comprised in the second version of the digital object and not comprised in the at least one update request comprises an unrequested digital item comprised in the second version of the digital object, and wherein the indication of the missing data from the second version of the digital object comprises a requested digital item comprised in the at least one update request.

17. The method of clause 12, wherein validate the at least one difference between the first version of the digital object and the second version of the digital object is agnostic to a location within the second version of the digital object where the difference is compliant with the at least one pseudo-instruction.

18. The method of clause 11, wherein the first structured representation object and the second structured representation object comprise at least one of a spatial coordinate of a text of a version of a digital object, a layout of a version of the digital object, a relative location of a text block in order of occurrence in a version of the digital object, a predicted category of a content of the version of the digital content, a unique identifier of a content within the version of the digital object.

19. The method of clause 11, wherein the first version of the digital object is a first version of a media object, and the second version of the digital object is a second version of the media content.

20. A non-transitory computer readable medium comprising code which, when executed by a processor, causes the processor to:
receive a first version of a digital object and a second version of the digital object wherein the first version of the digital object comprises a first metadata associated with at least one update request related to the digital object and wherein the second version of the digital object comprises a second metadata associated with at least one update response related to the digital object;
extract a first plurality of data items from the first metadata, and a second plurality of data items from the second metadata,
utilize a categorization machine learning model to generate a first structured representation object generated based on the first plurality of data items, and a second structured representation object generated based on the second plurality of data items; and
identify at least one difference between the first structured representation object and the second structured representation object.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. An apparatus, comprising:
a processor;
and a non-transitory memory storing instruction thereon which, when executed by the processor, causes the processor to:
receive a first version of a digital object and a second version of the digital object wherein the first version of the digital object comprises a first metadata associated with at least one update request related to the digital object and wherein the second version of the digital object comprises a second metadata associated with at least one update response related to the digital object;
extract a first plurality of data items from the first metadata, and a second plurality of data items from the second metadata;
utilize a categorization machine learning model to generate a first structured representation object generated based on the first plurality of data items, and a second structured representation object generated based on the second plurality of data items;
identify at least one difference between the first structured representation object and the second structured representation object;
utilize a natural language processing technique to produce at least one pseudo-instruction representing the at least one update request related to the digital object;
validate the at least one difference between the first version of the digital object and the second version of the digital object when the at least one difference is compliant with the at least one pseudo-instruction; and
send an auto-validation report comprising the validation of the at least one difference to a client computing device.

2. The apparatus of claim 1, wherein the at least one difference is a first difference and the at least one pseudo-instruction is a first pseudo-instruction, wherein at least one second difference is not compliant with at least one second pseudo-instruction, and wherein the processor sends an auto-validation report comprising a non-compliant message to the client computing device.

3. The apparatus of claim 2, wherein the non-compliant message indicates a location in the second version of the digital object where the at least one second difference is not compliant with the at least one second pseudo-instruction.

4. The apparatus of claim 3, wherein the non-compliant message comprises an indication of an additional data item comprised in the second version of the digital object and not comprised in the at least one update request, and an indication of a missing data item from the second version of the digital object comprised in the update response.

5. The apparatus of claim 4, wherein the indication of the additional data item comprised in the second version of the digital object and not comprised in the at least one update request comprises an unrequested digital item comprised in the second version of the digital object, and wherein the indication of the missing data from the second version of the digital object comprises a requested digital item comprised in the at least one update request.

6. The apparatus of claim 1, wherein validating the at least one difference between the first version of the digital object and the second version of the digital object is agnostic to a location within the second version of the digital object where the difference is compliant with the at least one pseudo-instruction.

7. The apparatus of claim 1, wherein the first structured representation object and the second structured representation object comprise at least one of a spatial coordinate of a text of a version of a digital object, a layout of a version of the digital object, a relative location of a text block in order of occurrence in a version of the digital object, a predicted category of a content of a version of the digital object, and a unique identifier of a content within a version of the digital object.

8. The apparatus of claim 1, wherein the first version of the digital object is a first version of a media object, and the second version of the digital object is a second version of the media object.

9. The apparatus of claim 1, identifying at least one difference between the first structured representation object and the second structured representation object based on metrics comprising metrics indicating identical content, metrics indicating similarity between substrings of content, or Jaccard similarities.

10. A method comprising:
receiving by a processor, a first version of a digital object and a second version of the digital object wherein the first version of the digital object comprises a first metadata associated with at least one update request related to the digital object and wherein the second version of the digital object comprises a second metadata associated with at least one update response related to the digital object;
extracting by the processor, a first plurality of data items from the first metadata, and a second plurality of data items from the second metadata;
utilizing by the processor, a categorization machine learning model to generate a first structured representation object generated based on the first plurality of data items, and a second structured representation object generated based on the second plurality of data items;
identifying by the processor, at least one difference between the first structured representation object and the second structured representation object;
utilizing by the processor, a natural language processing technique to produce at least one pseudo-instruction representing the at least one update request related to the first version of the digital object;
validating by the processor, the at least one difference between the first version of the digital object and the second version of the digital object when the at least one difference is compliant with the at least one pseudo-instruction; and
sending by the processor, an auto-validation report comprising the validation of the at least one difference to a client computing device.

11. The method of claim 10, wherein the at least one difference is a first difference and the at least one pseudo-instruction is a first pseudo-instruction, wherein at least one second difference is not compliant with at least one second pseudo-instruction, and wherein the processor sends an auto-validation report comprising a non-compliant message to the client computing device.

12. The method of claim 11, wherein the non-compliant message highlights or indicates a location in the second version of the digital object where the at least one second difference is not compliant with the at least one second pseudo-instruction.

13. The method of claim 12, wherein the non-compliant message comprises an indication of an additional data item comprised in the second version of the digital object and not comprised in the at least one update request, and an indication of a missing data item from the second version of the digital object comprised in the update response.

14. The method of claim 13, wherein the indication of the additional data item comprised in the second version of the digital object and not comprised in the at least one update request comprises an unrequested digital item comprised in the second version of the digital object, and wherein the indication of the missing data from the second version of the digital object comprises a requested digital item comprised in the at least one update request.

15. The method of claim 10, wherein validating the at least one difference between the first version of the digital object and the second version of the digital object is agnostic to a location within the second version of the digital object where the difference is compliant with the at least one pseudo-instruction.

16. The method of claim 10, wherein the first structured representation object and the second structured representation object comprise at least one of a spatial coordinate of a text of a version of a digital object, a layout of a version of the digital object, a relative location of a text block in order of occurrence in a version of the digital object, a predicted category of a content of a version of the digital object, and a unique identifier of a content within a version of the digital object.

17. The method of claim 10, wherein the first version of the digital object is a first version of a media object, and the second version of the digital object is a second version of the media object.

18. A non-transitory computer readable medium comprising code which, when executed by a processor, causes the processor to:
receive a first version of a digital object and a second version of the digital object wherein the first version of the digital object comprises a first metadata associated with at least one update request related to the digital object and wherein the second version of the digital object comprises a second metadata associated with at least one update response related to the digital object;
extract a first plurality of data items from the first metadata, and a second plurality of data items from the second metadata;
utilize a categorization machine learning model to generate a first structured representation object generated based on the first plurality of data items, and a second structured representation object generated based on the second plurality of data items;
identify at least one difference between the first structured representation object and the second structured representation object;
utilize a natural language processing technique to produce at least one pseudo-instruction representing the at least one update request related to the digital object;
validate the at least one difference between the first version of the digital object and the second version of the digital object when the at least one difference is compliant with the at least one pseudo-instruction; and
send an auto-validation report comprising the validation of the at least one difference to a client computing device.

* * * * *